United States Patent
Tejero Salinero et al.

(10) Patent No.: US 9,533,719 B2
(45) Date of Patent: Jan. 3, 2017

(54) PROCEDURE FOR PANEL ASSEMBLY AND DEVICE ASSOCIATED THERETO

(75) Inventors: Isaac Tejero Salinero, Molins De Rei (ES); Jesus J. Randez Perez, Sant Vicenc M. (ES); Christian Albert Ostergren, Alingsas (SE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 495 days.

(21) Appl. No.: 13/994,665

(22) PCT Filed: Dec. 16, 2011

(86) PCT No.: PCT/US2011/065529
§ 371 (c)(1),
(2), (4) Date: Jun. 14, 2013

(87) PCT Pub. No.: WO2012/083186
PCT Pub. Date: Jun. 21, 2012

(65) Prior Publication Data
US 2013/0270868 A1 Oct. 17, 2013

(30) Foreign Application Priority Data
Dec. 17, 2010 (ES) .................................. 201031873

(51) Int. Cl.
*F16B 5/10* (2006.01)
*B62D 27/06* (2006.01)
(Continued)

(52) U.S. Cl.
CPC .............. *B62D 27/065* (2013.01); *B62D 65/02* (2013.01); *F16B 5/02* (2013.01); *F16B 5/10* (2013.01);
(Continued)

(58) Field of Classification Search
CPC .............. F16B 5/10; F16B 21/02; F16B 21/04
(Continued)

(56) References Cited

U.S. PATENT DOCUMENTS

| | | | | |
|---|---|---|---|---|
| 1,911,820 A | * | 5/1933 | Fitzgerald | F16B 5/0266 411/350 |
| 2,390,325 A | * | 12/1945 | Rapp | F16B 5/02 411/366.1 |

(Continued)

FOREIGN PATENT DOCUMENTS

| | | |
|---|---|---|
| DE | 2060761 A1 | 6/1971 |
| DE | 7803988 U1 | 9/1978 |

(Continued)

OTHER PUBLICATIONS

International Search Report and Written Opinion corresponding to PCT/US2011/065529, dated Jun. 1, 2012.

*Primary Examiner* — Flemming Saether
(74) *Attorney, Agent, or Firm* — Hauptman Ham, LLP (57) ABSTRACT

Procedure for the assembling between at least two panels, and a device associated thereto, where said procedure is carried out through at least a single operator or machine, and comprises the following steps: receiving at least two panels, where said panels comprise respectively at least one through hole; introducing an assembling device comprising a nut and a screw, through the respective hole of each panel; turning the device around the same side where it was introduced previously, in such a way that the nut and the screw rotate jointly, until the device comes into contact with at least one blocking element, and the joint movement of the nut with the screw is stopped; and next the nut and the screw are brought mutually closer together, in such a way that both panels are assembled.

13 Claims, 4 Drawing Sheets

(51) Int. Cl.
  *F16B 21/04* (2006.01)
  *F16B 5/02* (2006.01)
  *F16B 37/04* (2006.01)
  *B62D 65/02* (2006.01)
  *F16B 41/00* (2006.01)
(52) U.S. Cl.
  CPC ............ *F16B 21/04* (2013.01); *F16B 37/042* (2013.01); *F16B 37/044* (2013.01); *F16B 41/002* (2013.01); *Y10T 29/49948* (2015.01)
(58) Field of Classification Search
  USPC .............................. 411/84, 85, 349, 549, 551
  See application file for complete search history.

(56) References Cited

U.S. PATENT DOCUMENTS

| | | | | |
|---|---|---|---|---|
| 2,403,247 A * | 7/1946 | Sullivan | ................... | F16B 5/02 411/261 |
| 3,444,917 A | 5/1969 | Bennett | | |
| 3,472,542 A * | 10/1969 | Hart | ........................ | F16B 21/02 403/22 |
| 3,664,434 A | 5/1972 | Connor et al. | | |
| 6,331,092 B1 * | 12/2001 | Linger | ................... | E04B 2/761 403/367 |
| 7,524,154 B2 * | 4/2009 | LaConte | ............ | B64D 11/0696 411/349 |
| 8,807,900 B2 * | 8/2014 | Ramsauer | ............... | E05B 9/084 411/347 |
| 8,915,321 B2 * | 12/2014 | Lejeune | ................... | B60K 1/04 180/68.5 |

FOREIGN PATENT DOCUMENTS

| | | |
|---|---|---|
| DE | 102004003714 A1 | 8/2005 |
| EP | 0268510 A1 | 5/1988 |
| FR | 2101686 A5 | 3/1972 |
| GB | 561215 A | 5/1944 |

* cited by examiner

PROCEDURE FOR PANEL ASSEMBLY AND DEVICE ASSOCIATED THERETO

RELATED APPLICATIONS

This application is a National Phase of International Application Number PCT/US2011/065529, filed Dec. 16, 2011, and claims the benefit of Spanish Application 201031873 filed Dec. 17, 2010.

TECHNICAL FIELD OF THE INVENTION

This invention relates to a procedure for panel assembly and the device associated thereto, where the assembly is preferably performed between the panels of a vehicle; and where said process is of application preferably in the automotive industry, in particular in the assembly between the panels forming the bodywork of the vehicle, together with the panels forming the inner coating of said vehicle.

This panel assembly procedure and the device associated thereto have the purpose of reducing the times of assembly and coupling between two or more panels, such that as well as reducing assembly time, only one worker or machine shall be necessary to perform such assembly, since each assembly device is inserted on a single side, and the worker or machine only have to screw, on that same side, each device without having to turn the panels or hold the other side of each device object of the invention; we thus manage to save time, prevent handling risks and reduce the need of the worker to travel about the work area; All this is achieved with a simple assembly procedure and with a device formed by simple parts that are easily shaped and which is economically viable, since they can be shaped preferably in plastic materials.

BACKGROUND OF THE INVENTION

The constant search for cost cutting in the manufacturing and assembly stages for all the components of a vehicle as such is well known in the vehicle manufacturing industry. With respect to the assembly stage, this stage requires qualified workers, who are generally located on an assembly line, where they assemble the corresponding parts of the vehicle onto the chassis of a vehicle.

Namely, in said assembly phase, one of the stages relates to the assembly of the inner panels of the vehicle, coupled to the bodywork panels of the vehicle; and where this step is currently performed as follows:

The worker receives one of the panels to be assembled, where said panel has been previously perforated in order to introduce the corresponding joining devices.

The worker inserts the respective joining screws through the openings and from only one side of the panel.

Subsequently, another worker located at the other side of the panel then places another panel that rests on the screws, in order to then thread a nut onto each screw and therefore make the joining devices fasten and assemble the corresponding panels.

This procedure thus requires two workers or machines, depending on the automation of the assembly line, where one inserts a screw into the panel on one side and then another worker couples the other panel and proceeds to assemble the whole by tightening the corresponding nut.

One of the possible solutions in order to save assembly costs is that of reducing the cost of the fastening device, where we currently have a device consisting in a screw and a nut, preferably made in plastic materials, since:

The material is cheaper to shape with respect to the cost of metallic materials;

the material is lighter and therefore reduces the total weight of the vehicle, increasing its performance and reducing consumption; and the material is more elastic and allows filtering possible vibrations generated in the body.

But the savings on the device itself do not involve very important savings with respect to the costs in investment in order to reduce its manufacturing cost.

Therefore, the other possible solution considered is reducing the cost of the assembly procedure and the coupling of the respective panels in order to reduce the assembly stages and manage to reduce the price of the total cost of the corresponding vehicle; and it is therefore necessary to invent a new procedure protocol for panel assembly and a new device associated to the procedure which allows reducing assembly times and also saving time and preventing handling risks and the need of the worker to travel about the work area.

DESCRIPTION OF THE INVENTION

This invention relates to a procedure for assembly of at least two panels, preferably of a vehicle, and the device associated thereto, which notably solve the drawbacks described above and allow reducing the assembly time of said panels, and therefore reduce the total assembly cost of the vehicle; where the assembly is preferably between panels forming the vehicle body together with panels forming the inner coating of said vehicle.

The assembly procedure between at least two panels proposed by the invention is performed by at least a single worker or machine, and comprises the following steps:

a) receiving at least two panels, where said panels respectively comprise at least one through-hole and where at least one of the holes comprises a polygonal or oval geometry; i.e. the holes are not restricted to comprising a polygonal or oval geometry, but only one of them should have such geometry; and as an explanation, the geometry of said at least one hole may be polygonal or oval, also considering other geometries such as irregular curves, but avoiding circular geometries in order to allow correct assembly;

b) inserting, from a single side of one of the two panels, an assembly device comprising a screw and a nut, through the corresponding hole in each panel, such that the screw head is located on the outside of one of the panels and the nut on the outside of the other panel, opposite to the position of said screw head; this presents fundamental differences with respect to the current state of the art, since in this stage the entire device is inserted from a single side, such that the panels are located in the intermediate part of the device, and since this is inserted from a single side, at least a single worker or machine is required to perform this coupling step to couple the device into each hole of the respective panels; and finally c) rotating the device from the same as from where it was introduced in step b), such that:

the nut and the screw turn jointly until the device comes in contact with at least one stopping element, such as for example a rib, which prevents the joint movement of the nut and screw; and then the nut and the screw come closer together such that both panels are assembled.

In this last step c) we can see how the device is continuously rotated from the same side as from which step b) was performed, and it is the device itself which couples and assembles the respective panels. Thus, it is the same worker or machine that inserted the devices in the holes in step b) who screws each device from that same side without having to move to the other side or requiring another worker or machine on the other side. This saves assembly time and reduces the total cost.

Having described the assembly procedure, we now describe two main associated assembly devices, preferably with the procedure described, where each device has similar technical features regarding functionality, but with different geometric technical features and different arrangement on the panels.

The first panel assembly device comprises:

a) a screw comprising a head and an at least partially threaded cylinder;

b) a nut that is coupled to the threaded surface of the screw cylinder; where, needless to say, the nut has a threaded inner hole that complements the outer thread of the threaded surface of the threaded cylinder of the screw; and c) a plate-like part that is freely coupled to the screw cylinder and located between the screw head and the nut; where said plate-like part can be part of the nut; and where said plate-like part comprises a plan surface that is greater than the respective holes in the panels, preventing its passage through said holes; and comprises, on one of its larger sides opposite the screw head, a plurality of first ribs that are coupled to part of the inner contour of said at least one hole with a polygonal or oval geometry, preventing it from rotating.

We shall now provide a more detailed explanation of the technical features described with respect to the parts comprising said first assembly device:

a) The screw is a standard screw, known in the state of the art.

b) The nut is located at one end of the screw cylinder, and there is a plate-like part located in an intermediate position between said nut and the screw head.

c) The plate-like part, in order to prevent said plate-like part from rotating together with the screw, comprises a plurality of first ribs that are coupled to part of the inner contour of said at least one opening with a polygonal or oval geometry preventing it from rotating; see, for example, for a hole with a square geometry, the first ribs will be preferably four and will be coupled to the corners of the hole contour, preventing the plate-like part from rotating at all times.

In order to continue with the assembly procedure described above, we consider the possibility that:

The nut comprises a plurality of second ribs; and the plate-like part comprises a plurality of cavities that can come in contact with the second ribs of the nut, preventing the joint rotation between said nut and the plate-like part, such that according to the procedure described above, this coupling between the ribs and cavities of both parts (nut and plate-like part) limits and prevents the joint rotation of the nut with the screw, such that since the screw and nut threads are coupled to one another, the continued rotation of the device causes the nut to move closer to the screw head.

In order to clarify the explanation, the nut cavities prevent the joint rotation of the screw and nut, observing that the plate-like part is freely coupled to the screw cylinder, since if it were jointly coupled there would be no contact between the second ribs of the nut with the respective cavities of said plate-like part.

We consider the possibility, in order to ensure the correct coupling of the device to the respective panels, and so that they are perfectly coupled, that the nut of the device comprises a plurality of third ribs that may come into contact with the surface on the outer side of one of the panels, opposite to said screw head; such that both panels become assembled. These third ribs are provided on the nut, since it is this nut that will be shifted towards the screw head once the first ribs of the nut come into contact with the cavities of the intermediate part, thus preventing the joint movement of the screw and the nut; such that it is the third ribs which rest on the surface of the outer side, corresponding to the panel located opposite the area of the screw head, and this contact between the ribs and the outer side assembles the respective panels in a fast and simple manner.

Remembering that all the stages described in the assembly procedure and linked to this first assembly device are performed from a single side, this being an essential condition for reducing times and risk with respect to the panel assembly procedure described above and known in the state of the art. And therefore, the device described is presented with three parts (nut, screw and plate-like part) that are coupled to one another, such that the entire assembly of parts forming the assembly device is introduced from a single side of the two panels, as described in step b), in order to subsequently screw the screw and achieve their correct assembly, as described in step c).

We contemplate the possibility that the screw cylinder comprises, on the side opposite to the screw head, a rib that can come into contact with the nut, thus preventing the extraction of said nut from the device, mainly by the lower end of the screw cylinder in the event of an accidental stress on said nut; where said rib comprises a geometry that is greater than the through hole of the nut, such it prevents it from being extracted.

Finally, and with respect to the first panel assembly device, we consider the possibility that the screw head comprises in its top portion at least some fastening means that allow coupling a tightening tool for the first device object of the invention; such that said fastening means are arranged on the screw head, and so that it is therefore from this side that the worker or machine rotate the screw in order to assemble the respective panels of the vehicle.

Thus, by applying the procedure mentioned above in conjunction with the first device described, we obtain as a product the assembly of at least two panels, joined as a result of a plurality of first devices, with their respective technical features described above.

As a complement to the first assembly device described above, we shall now describe a second panel assembly device with different geometrical technical features but with the same function, described with respect to the first assembly device: to assemble at least two panels from a single side of one of the two panels, with a device that is simple to make and economically viable.

The second assembly device related to the assembly procedure described above comprises:

a) A nut that is coupled to a threaded screw surface, where said nut comprises a radial extension with a plan surface that is greater than the respective panel holes, thus preventing its passage through said openings; and b) a screw, which comprises a head, an at least partially threaded cylinder and a plate located between the head and the cylinder;

where said plate comprises a larger plan surface than that of one of the holes that comprising a polygonal or oval geometry, and which belongs to a first panel to be assembled; such that said plate can come in contact with the first panel, thus preventing its passage; that is, the plate belonging to the screw allows the passage of at least one of the panels to be assembled, but prevents the passage of one of the panels where there is a hole with a polygonal or oval geometry, which technical feature is essential due to the final arrangement of the panels to be assembled;

and where said screw head additionally comprises a plurality of ribs that can come in contact with at least part of the inner contour of said at least one hole with a polygonal or oval geometry.

We observe, with respect to the first assembly device described above, the non-existence of a plate-like part located intermediately between the screw head and the nut, such that this second device comprises one less component, and therefore its manufacturing process is cheaper; but we observe in turn that this second assembly device requires one of the holes to allow the passage of the plate present on the screw head, for the plurality of ribs to come in contact with at least part of the inner contour of said at least one hole with a polygonal or oval geometry; and fastening this first panel to the screw head.

With respect to achieving this correct fastening, we contemplate the possibility that the screw head may additionally comprises a plurality of cavities that may come in contact with part of said inner contour of the first profile, such that the respective opening must have a polygonal geometry, preferably square or oval; and thus achieve the correct fastening of this first panel to the screw head; preventing the joint rotation of the screw and the nut; where these cavities belonging to the screw head, when this second device is rotated, come in contact with the inner contour of the hole of the first panel until they reach a point in which the screw head can no longer turn together with the screw, and the nut then tightens towards the screw head.

The possibility of the plurality of cavities present on the screw head comprising an inclined plane geometry, such that they allow a certain degree of rotation of the screw head until the inner contour of said first panel comes in contact and fits into said cavities. This special feature of the geometry of the cavities of the screw head allows said head to pass through the hole with a polygonal or oval geometry until the first panel comes in contact with the screw head; and once the head starts to turn, the inclined planes allow the panel to become coupled to the cavities and, therefore to fasten to the screw head, thus also preventing the screw from rotating together with its respective nut.

In addition, we also contemplate the possibility that the screw head comprises a plurality of deformable, wedge-shaped ribs, the longest side of which can come in contact with the outer surface of said first panel; these ribs deform when the screw head is inserted through the hole with a polygonal or oval geometry of said first panel, so that subsequently their longer side can come in contact with the outer surface of the first panel, improving its fastening and preventing this panel from being extracted from the screw head in the event of accidental stress.

Finally, and with respect to this second panel assembly device, we consider the possibility that the nut comprises fastening means that allow coupling a tightening tool for the second device object of the invention; such that said fastening means are arranged on the nut, and so that it is therefore from this side that the worker or machine rotate the device in order to assemble the respective panels of the vehicle.

And thus, by applying the procedure mentioned above in conjunction with the second device described, we obtain as a product the assembly of at least two panels, joined as a result of a plurality of second devices, with their respective technical features described above.

We additionally consider other different assembly devices, preferably associated with the procedure described; such as for example a third device, similar to the first main device, where said third device comprises:

a screw comprising a head and an at least partially threaded cylinder;

a nut that is coupled to the threaded surface of the screw cylinder a ring-like part that is freely coupled to the screw cylinder and located between the screw head and the nut, where said ring part can be part of the nut; and where said ring-like part comprises a plan surface that is greater than the respective holes in the panels, preventing its passage through said holes.

And where the nut comprises a deformable, clip-shape geometry such that it allows passage through the panel holes in one direction, but prevent its extraction in the opposite direction; this being a geometric lock as long as at least one of the holes comprises a polygonal or oval geometry.

Thus, according to the invention described, the assembly procedure for vehicle panels and its associated devices proposed by the invention lead to a reduction in the time for the assembly and coupling of two or more panels of said vehicle, such that as well as reducing the coupling time they also require the work of a single worker or machine to perform said assembly, since the assembly device is introduced from a single side and the only worker or machine only have to screw the device from that same side without having to turn the panels or to hold the device object of the invention from the other side; thus also preventing handling risks and the need of the worker to travel about the work area; and all this with a simple assembly procedure and with a device consisting of simple parts that are easy to make.

DESCRIPTION OF THE DRAWINGS

In order to complement the description that is being made herein and with the object of helping to achieve a better understanding of the invention features, according to two preferred practical embodiment examples thereof, a set of drawings have been enclosed as an integral part of said description, in which, by way of illustrative nature only but by no means imitative, the following has been represented.

PREFERRED EMBODIMENT OF THE INVENTION

Figure 1:
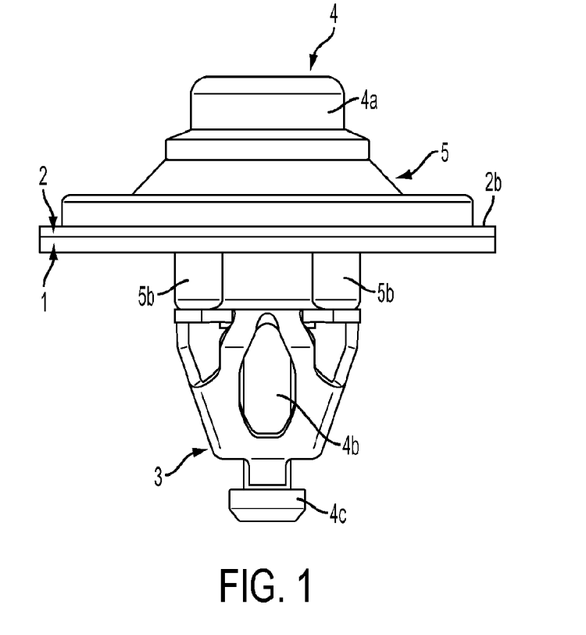
FIG. 1.—Shows a schematic elevational view of the first assembling with the respective panels ready to be assembled.
Figure 2:
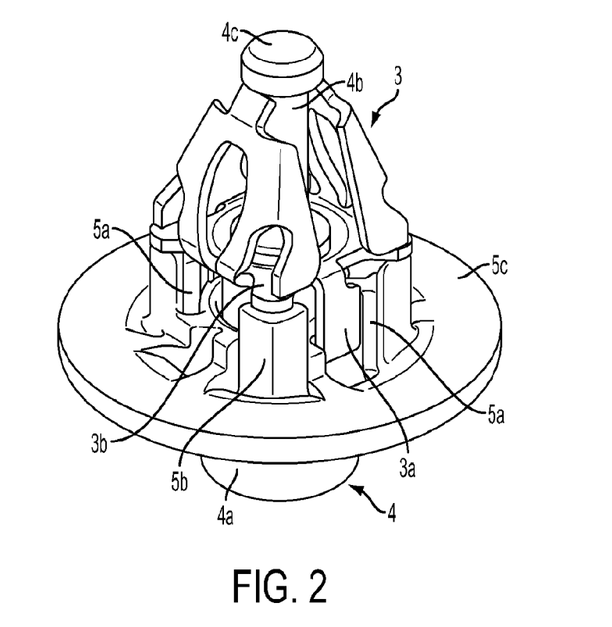
FIG. 2.—Shows a three-dimensional schematic view of the first assembling device for vehicle panels.
Figure 3:
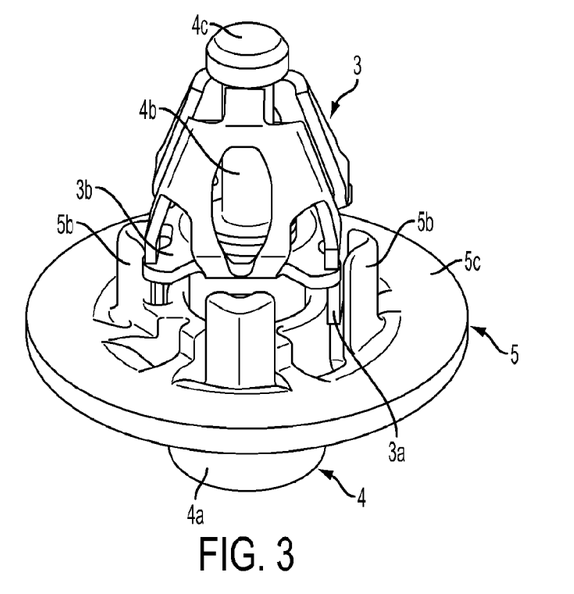
FIG. 3.—Shows a three-dimensional schematic view of the first assembling device for vehicle panels where the nut rotates jointly with the screw.
Figure 4:
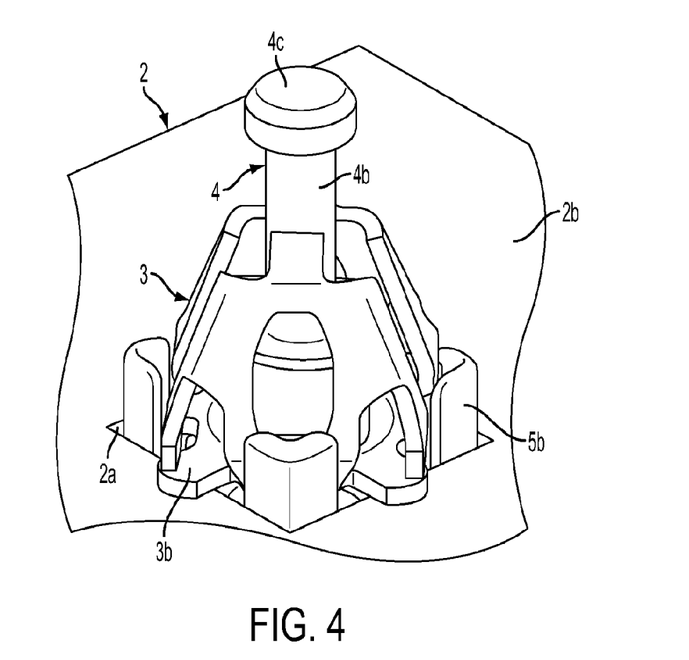
FIG. 4.—Shows a three-dimensional schematic view of the first assembling device for vehicle panels where the bolt is engaged into the plate like piece and the panels are engaged with each other.

In view of FIGS. 1 to 4, it can be observed one of the eventual embodiments of the first assembling device for vehicle panels (1, 2), where two panels (1, 2) comprise respectively a plurality of through holes (1a, 2a), where additionally, each of the holes (1a, 2a) of the respective panels (1, 2), has a quadrangular geometry; and where this first device is associated to the assembling procedure described above; in such a way that this first device comprises:

- A screw (4) which comprises a head (4a) and a partially threaded cylinder (4b);
- a screw (3) which is engaged into the screw (4) threaded cylinder surface (4b), where said nut (3) comprises two second flanges (3a); and
- a plate like piece (5) freely engaged to the screw (4) cylinder (4b) and located between the head (4a) of the screw (4) and the nut (3); where said plate like piece (5) comprises a plant surface larger that the respective holes (1a, 2a) of the panels (1, 2), restricting their passage through said holes (1, 2); and also comprises, in one of its larger faces (5c) opposite to the screw (4) head (4a):
  - Four first flanges (5b) which engage to part of the internal hole contour (1a) with a quadrangular geometry, preventing its rotation by the engagement of each first flange (5b) in each one of the hole angles (1a); and
  - Two cavities (5a) that can come into contact with the two second nut (3) flanges (3a), preventing the nut (3) from rotating jointly with the plate like piece (5) once the two second flanges (3a) have been introduced into the respective cavities (5a) and preventing such rotation.

Additionally, the nut (3) comprises four third flanges (3b), which can come into contact with the surface of the external side (2b) of one of the panels (2) opposite with regard to said screw (4) head (4a), in such a way that both panels (1, 2) are assembled; so when the operator or machine is ready for rotating the first device described, the following takes place:

- The plate like piece (5) doesn't rotate jointly with the screw (4) and the nut (3), since the four first flanges (5b) have come into contact with the angles of the internal contour of the hole (1a) with quadrangular geometry.
- The nut (3) starts to rotate jointly with the screw (4) until both second flanges (3a) of the nut (3) come into contact with the respective cavities (5a) of the plate-like piece (5) and thus no allowing the nut (3) to continue rotating jointly with the screw (4).
- The screw (4) continues rotating and the approximation of the nut (3) and the screw (4) takes place, in such a way that the panels (1, 2) are brought closer together.
- The four third flanges (3b) come into contact with the external side surface (2b) of one of the panels (2), so both panels (1, 2) are assembled.

Further, the screw (4) cylinder (4b) comprises, in the opposite end of its head (4a), a flange (4c) that can come into contact with the nut (3) preventing the extraction of said nut (3) with regard to the device. And on this head (4a) are displayed gripping means (4d) which allow the engagement of a tightening tool like a screw-driving pistol.

Figure 5:
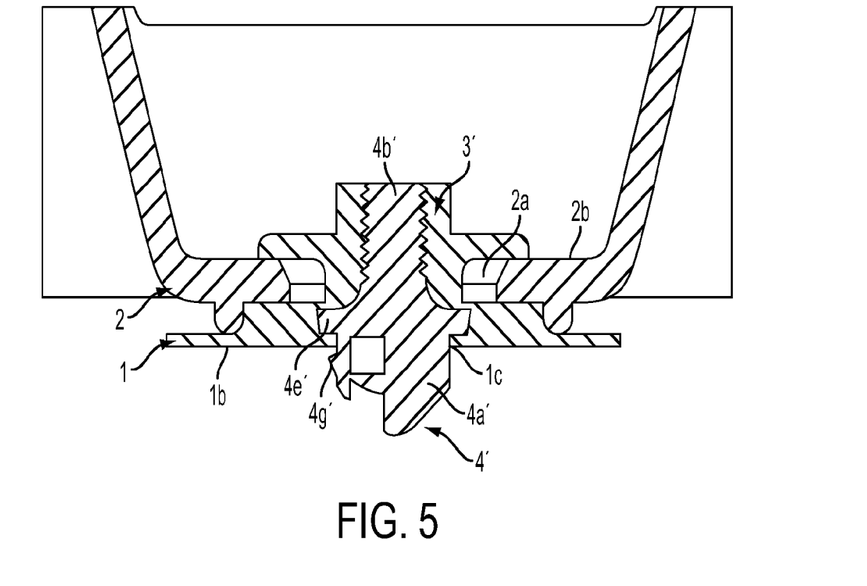
FIG. 5.—Shows an elevational schematic view of the second assembling device with the respective panels already assembled.
Figure 6:
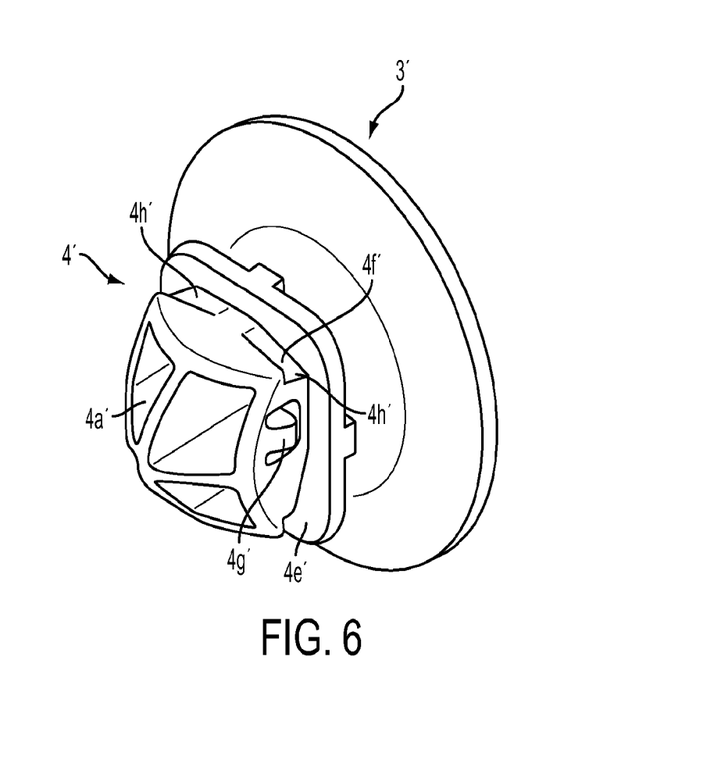
FIG. 6.—Shows a three-dimensional schematic view of the second assembling device for vehicle panels.
Figure 7:
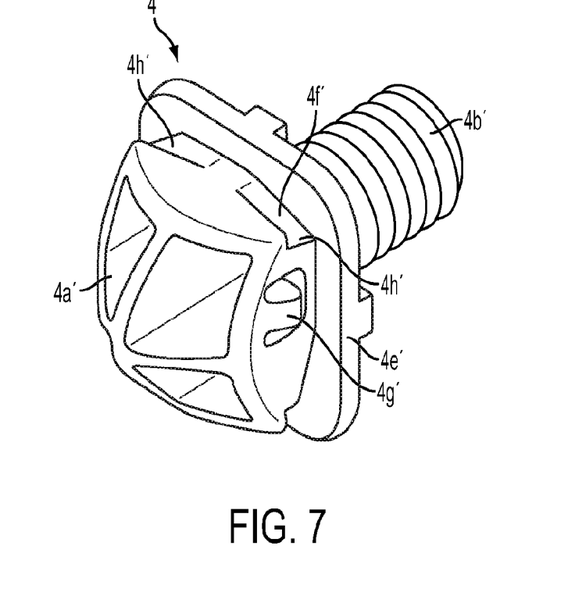
FIG. 7.—Shows a three-dimensional schematic view of the screw belonging to the second assembling device for vehicle panels.
Figure 8:
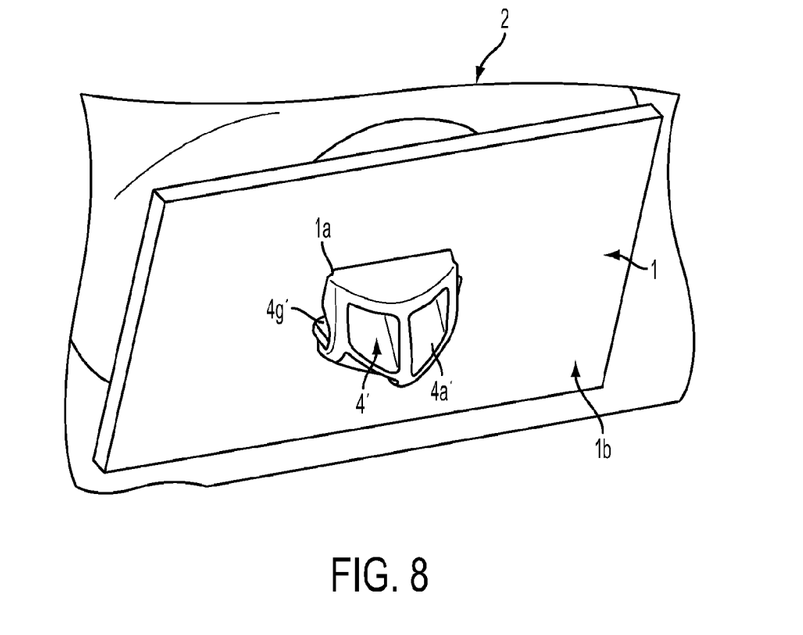
FIG. 8.—Shows a three-dimensional schematic view of the second assembling device for vehicle panels where the panels are engaged with each other.

In a complementary way, in view of FIGS. 5 to 8, it can be observed one of the eventual embodiments of the second assembling device for vehicle panels (1, 2), where again two panels (1, 2) comprise respectively a plurality of through holes (1a, 2a), where additionally each one of the holes (1a, 2a) of the respective panels (1, 2) has a quadrangular geometry; and where this second device is associated to the assembling procedure described above; in such a way that said second device comprises:

- A nut (3') which is engaged into the threaded surface of a screw (4'), where said nut (3') comprises a radial extension whose plant surface is larger than the respective holes (1a, 2a) of the panels (1, 2), restricting their passage through said holes (1a, 2a); and
- the screw (4') comprises a head (4a'), a threaded cylinder (4b'), and a plate (4e') located between the head (4a') and the cylinder (4b'); where said plate (4e') comprises a plant surface larger than one of the holes (1a) with quadrangular geometry of the first panel (1); in such a way that said plate (4e') can come into contact with the first panel (1) preventing its passage; and where the screw (4') head (4a') comprises:
  - four flanges (4h') that can come into contact with at least part of the internal contour of at least one, of said holes (1a') with polygonal or oval geometry; and
  - four cavities (4f') which also can come into contact with part of the internal contour (1c) of said first panel (1), preventing the screw (4') from rotating jointly with the with the nut (3').

To prevent the screw (4) from rotating jointly with the nut (3), once the second device has been introduced into the holes (1a, 2a) of the panel, the four cavities (4f') comprise a sloping plane geometry, in such a way that the internal contour (1c) of the first panel (1) slides through the cavities (4f') until they tighten (given that they have a sloping plane) and block the rotation of the screw (4') head (4a') due, at the same time, to the contact with the four flanges (4h') of the screw (4') head (4a'). This is achieved because part of the head (4a') goes through the quadrangular geometry hole (1a), and when rotating slightly the screw (4') head, the sloped planes of the cavities (4f') fit into the internal contour (1c) until blocking said rotation.

Additionally, the screw (4') head (4a') comprises a pair of wedge shaped deformable flanges (4g'), whose larger side can come into contact with the external surface (1b) of said first panel (1) when the assembling of both panels (1, 2) takes place; and providing an increase in the device security since said wedges (4g') hold back the panels (1, 2) in the event of an overstrain and the extraction of the internal contour (1c) of the first panel (1) with regard to the cavities (4f') shaped with sloping planes.

Finally, on the nut (3') are shown gripping means (3d') which allow the engagement of a tightening tool like a screw-driving pistol, to proceed to the rotation of the device object of the invention.

In view of this description and set of figures, those skilled in the art will be able to understand that the embodiments of the invention that have been described can be combined in multiple ways within the scope of this invention. The invention has been described according to some preferred embodiments of the same, but for those skilled in the art it shall be obvious that multiple variations can be introduced in said preferred embodiments without exceeding the scope of the claimed invention.

The invention claimed is:

1. A device configured to hold at least two panels together, the panels respectively including non-circular through holes, the device comprising:
   a screw having a head and a cylinder that is at least partially threaded;
   a nut engaged into the threaded portion of the screw cylinder; and
   a panel support component including a planar surface, wherein the device is configured such that the planar surface abuts one of the two panels during holding of the at least two panels together, wherein
   the device is configured such that the panel support is freely engaged onto the screw cylinder, and located between the screw head and the nut such that the planar surface is normal to a direction of extension of the cylinder,
   the planar surface has an outer perimeter that restricts passage of the panel support through said holes of the panels,
   the panel support component comprises, in a face opposite to the screw head, a plurality of first flanges which engage into the internal contour part of at least one of said holes preventing the panel support from rotating, and
   collectively, outer faces of the plurality of first flanges form a general square shape.

2. The device of claim 1, wherein:
   the plurality of first flanges are monolithic with the portion of the panel support that forms the planar surface.

3. The device of claim 1, wherein:
   the nut, the screw and the panel support are symmetrical about two planes normal to each other and parallel to a longitudinal direction of extension of the cylinder.

4. The device of claim 1, wherein:
   the screw includes a flange located opposite the head, wherein the flange of the screw is configured to prevent extraction of the nut from the device.

5. An assembly, comprising:
   the device of claim 1; and
   the two panels, wherein the device holds the two panels together, and
   at least one of the two panels has a rectangular hole.

6. The device of claim 1, wherein:
   the plurality of first flanges are elongate components having an "L" shape cross section lying in a plane normal to the longitudinal axis, respective concave portions of the "L" facing a longitudinal axis of the device.

7. A device configured to hold at least two panels together, the panels respectively including non-circular through holes, the device comprising:
   a screw having a head and a cylinder that is at least partially threaded;
   a nut engaged into the threaded portion of the screw cylinder; and
   a panel support component including a planar surface, wherein the device is configured such that the planar surface abuts one of the two panels during holding of the at least two panels together, wherein
   the device is configured such that the panel support is freely engaged onto the screw cylinder, and located between the screw head and the nut such that the planar surface is normal to a direction of extension of the cylinder,
   the planar surface has an outer perimeter that restricts passage of the panel support through said holes of the panels,
   the panel support component comprises, in a face opposite to the screw head, a plurality of first flanges which engage into the internal contour part of at least one of said holes preventing the panel support from rotating, and
   the plurality of first flanges include at least four first flanges spaced uniformly about a longitudinal axis of the device.

8. A device configured to hold at least two panels together, the panels respectively including non-circular through holes, the device comprising:
   a screw having a head and a cylinder that is at least partially threaded;
   a nut engaged into the threaded portion of the screw cylinder; and
   a panel support component including a planar surface, wherein the device is configured such that the planar surface abuts one of the two panels during holding of the at least two panels together, wherein
   the device is configured such that the panel support is freely engaged onto the screw cylinder, and located between the screw head and the nut such that the planar surface is normal to a direction of extension of the cylinder,
   the planar surface has an outer perimeter that restricts passage of the panel support through said holes of the panels,
   the panel support component comprises, in a face opposite to the screw head, a plurality of first flanges which engage into the internal contour part of at least one of said holes preventing the panel support from rotating, and
   the plurality of first flanges are elongate components having an "L" shape cross section lying in a plane normal to the longitudinal axis.

9. The device of claim 8, wherein:
   the panel support component can make part of the nut.

10. The device of claim 8, wherein:
    collectively, outer faces of the plurality of first flanges form a general square shape.

11. The device of claim 8, wherein:
    the nut and the screw can rotate relative to the panel support while the plurality of flanges are in at least one hole of the panels.

12. The device of claim 8, wherein:
    the device is configured such that the nut is not removable from the screw.

13. An assembly, comprising:
    the device of claim 8; and
    the two panels, wherein the device holds the two panels together.

* * * * *